United States Patent [19]

Razzell

[11] Patent Number: 6,002,725

[45] Date of Patent: Dec. 14, 1999

[54] M-ARY FSK RECEIVER

[75] Inventor: Charles J. H. Razzell, Pleasanton, Calif.

[73] Assignee: U.S. Philips Corporation, New York, N.Y.

[21] Appl. No.: 08/916,774

[22] Filed: Aug. 20, 1997

[30] Foreign Application Priority Data

Aug. 22, 1996 [GB] United Kingdom .................. 9617598

[51] Int. Cl.$^6$ ............................ H03D 3/00; H04L 27/14; H04L 27/10

[52] U.S. Cl. .......................... 375/335; 375/272; 375/275; 375/334; 329/300; 329/302

[58] Field of Search ................... 375/335, 334, 375/272, 275; 329/302, 300

[56] References Cited

U.S. PATENT DOCUMENTS

| | | | |
|---|---|---|---|
| 5,202,901 | 4/1993 | Chennakeshu et al. ................. | 375/84 |
| 5,425,058 | 6/1995 | Mui ........................................ | 375/336 |
| 5,504,784 | 4/1996 | Niyogi et al. .......................... | 375/341 |
| 5,539,355 | 7/1996 | Nakamura .............................. | 329/302 |
| 5,805,017 | 9/1998 | Razzell ................................... | 329/300 |

OTHER PUBLICATIONS

Bolourchi, Nader, "Optimum Processing of Multilevel CPFSK", IEEE, pp. 681–684, Feb. 1992.

Kwon et al., "Limiter–Differential Detection of a Frquency–Hopped CPFSK Diversity System in a Partial–Band Jamming", IEEE Journal on Selected Areas in Communications, vol. 10, No. 4, pp. 724–730, May 1992.

Korn, "M–ary Frequency Shift Keying with Limiter–Discriminator–Integrator Detector in Satellite Mobile Channel with Narrow–Band Receiver Filter", IEEE Transactions on Communications, vol. 38, No. 10, pp. 1771–1778, Oct. 1990.

*Primary Examiner*—Stephen Chin
*Assistant Examiner*—Michael W. Maddox
*Attorney, Agent, or Firm*—Jack D. Slobod

[57] ABSTRACT

An M-ary FSK receiver in which a frequency down-converted signal is treated as an M-ary DPSK signal with symbol repetition coding. The output of a frequency demodulator (20) is integrated (22) over an optimally chosen time interval which is a fraction of the symbol interval to obtain N phase change estimates per symbol. These N sub-symbols are manipulated (24, 26) to obtain corresponding soft decisions which are then summed (32, 34) over a symbol period (or a substantial fraction thereof) to provide an overall soft decision for each bit comprising an M-ary symbol. These outputs may be used directly as soft decisions for forward error correction or applied to a threshold circuit to obtain hard decisions.

10 Claims, 2 Drawing Sheets

M-ARY FSK RECEIVER

BACKGROUND OF THE INVENTION

The present invention relates to a M-ary FSK receiver and to a method of demodulating a M-ary FSK modulated signal. Such receivers are used in communications receivers, such as paging receivers for POCSAG and ERMES which use M-ary FSK modulations.

In such receivers, an input signal is frequency down-converted to an IF which is passed to a demodulator and detector. For low cost applications such as paging, a limiter-discriminator-integrator (LDI) is widely used for recovering information upon which symbol decisions are made. The LDI approach provides a robust and simple detection method for M-ary FSK modulations. However, there is a performance penalty to pay for the simplicity of the hardware, the bit error rate (BER) does not compete with that available from other receiver structures, such as matched filter or correlator based detection.

OBJECTS AND SUMMARY OF THE INVENTION

It is an object of the present invention to improve the performance of limiter discriminator based data receivers without unduly increasing the complexity of the receiver.

According to the present invention there is provided an M-ary FSK receiver comprising means for frequency demodulating a modulated signal, means for integrating the output of the frequency demodulating means over a fraction of a symbol period to obtain N estimates of phase change per symbol, where N has a value of at least 2, means for converting these N estimates of phase change to soft decisions for the transmitted bits, and means for additively combining these soft decisions over at least a substantial proportion of a symbol period to obtain soft decisions for each of $\log_2 M$ bits per symbol.

According to a second aspect of the present invention there is provided a method of recovering an M-ary FSK signal, comprising frequency demodulating a modulated signal, integrating the frequency demodulated signal over a fraction of a symbol period to obtain N estimates of phase change per symbol, where N has a value of at least 2, converting these N estimates of phase change to soft decisions for the transmitted bits, and additively combining these soft decisions over at least a substantial proportion of a symbol period to obtain soft decisions for each of $\log_2 M$ bits per symbol.

The present invention is based on the recognition of the fact that FSK signals can be treated as differential phase shift keying modulation (DPSK) in which each sub-symbol is repeated N times thus forming a repetition code in which soft decisions can be used to advantage.

Each of these DPSK sub-symbols consists of a phase change $\Delta\phi_k$, where $\Delta\phi_k = 2\pi f_k T_s/N$ and where $T_s$ is the symbol period. By treating M-ary FSK as M-ary DPSK with symbol repetition encoding using N symbols per code word, the log likelihood ratios for each of the $\log_2 M$ bits is separately calculated according to the probability density functions (pdf) of received changes of $\Delta\phi_k$. Due to the use of a symbol repetition code, the optimum decoding method is simply to sum the respective soft decisions over each symbol period. This has been found to give an improved performance over known techniques such as directly integrating or filtering the samples of $\Delta\phi_k$.

In a first embodiment of the present invention the output from a discriminator is applied to an integrate and dump circuit which samples the signal from the discriminator. The samples which may be wrapped to keep them in the range $-\pi$ to $+\pi$, are quantised and then are used as an index to $\log_2 M$ lookup tables. N consecutive samples of each of the outputs of the lookup table are additively combined and applied to one or more threshold circuits, each of which provides a hard bit decision for each of the $\log_2 M$ outputs. The sign of the decision variable represents the most likely transmitted bit.

In a second embodiment of the present invention which is a variant of the first embodiment, the output from an additively combining stage comprises soft decisions which are available for further processing in an FEC (forward error correction) scheme.

In a third embodiment, the integrate and dump circuit is replaced by digital moving averages, for example an FIR filter with all taps set to unity.

BRIEF DESCRIPTION OF THE DRAWINGS

The present invention will now be described, by way of example, with reference to the accompanying drawings, wherein.

In the drawings, the same reference numerals have been used to indicate corresponding features.

DETAILED DESCRIPTION OF THE PREFERRED EMBODIMENT

Figure 1:
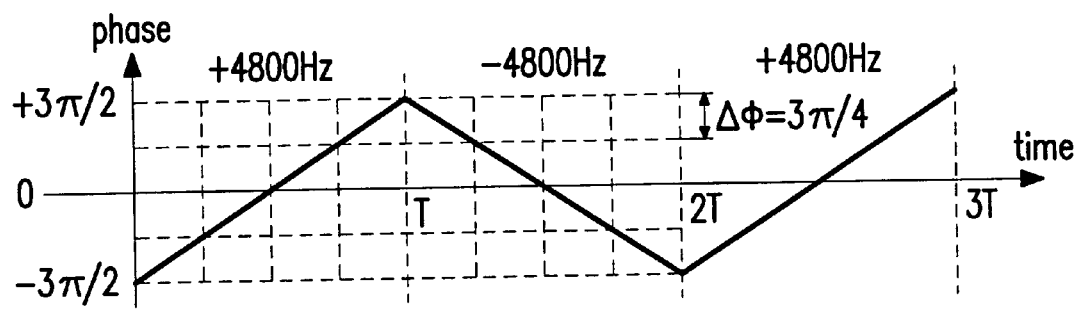
FIG. 1 is an illustrative phase trajectory for 4-FSK with 4800 Hz deviation at 3200 baud.

Referring to FIG. 1, a phase trajectory for 4-FSK with 4800 Hz deviation at 3200 baud is shown, the abscissa representing time and the ordinate representing phase. A symbol period is T and during successive symbol periods there is a phase change of $3\pi$, a low to high phase change indicating a frequency deviation of +4800 Hz and conversely a high to low phase change indicating a frequency deviation of −4800 Hz.

The M-ary FSK can also be viewed as M-ary DPSK with symbol repetition coding. Looking at FIG. 1, 4-FSK with deviations of ±1.6 kHz at 3200 Baud can be seen as $\pi/4$-DQPSK at 12800 Baud, with each symbol repeated 4 times. More particularly, FIG. 1 illustrates that if sampling is performed at 4 samples per symbol and the samples are taken at exactly the optimum timing instant, the phase change per sample interval, that is T/4, is $+3\pi/4$ radians corresponding to deviations of ±4.8 kHz respectively for all possible measurement intervals in the symbol.

As mentioned in the preamble of the present specification in M-ary FSK, M information symbols are mapped on to an identical number of carrier frequencies, usually chosen according to $f_k$ 2k−(M−1), where $k \in \{(0 \ldots (M-1)\}$. The symbol values, k, are related to the binary data to be transmitted by a suitable Gray code. If the modulated signal is sampled at a sampling rate N times that of the symbol rate, the samples may be seen as differential phase shift keying modulation (DPSK) in which each sub-symbol is repeated N times. Each of the DPSK sub-symbols consists of a phase change $\Delta\phi_k$, where $\Delta\phi_k=2\pi f_k T_s/N$, where $T_s$ is the symbol period.

By treating M-ary FSK as M-ary DPSK with symbol repetition coding using N symbols per code word, the log likelihood ratios for each of the $\log_2 M$ bits is separately calculated according to the probability density functions (pdfs) of received changes of $\Delta\phi_k$. Due to the use of a symbol repetition code, one decoding method is simply to sum the respective soft decisions over each symbol period.

Before describing embodiments of a receiver made in accordance with the present invention, a method of deriving the relevant soft decision information will be given.

The pdf of received phase changes due to Added White Gaussian Noise AWGN are taken where the transmitted phase is $\phi_k$ and the received phase change is $\Psi_k$ which is given for a signal to noise ratio $\lambda=E_s/N_o$;

$$f(\Psi_k \mid \phi_k) = \frac{1}{2\pi}e^{-\lambda}\left[1 + \sqrt{4\pi\lambda}\cos(\phi_k - \Psi_k)e^{\lambda\cos^2(\phi_k-\Psi_k)}\left(1 - \frac{1}{2}\mathrm{erfc}\left(\sqrt{\lambda}\cos(\phi_k - \Psi_k)\right)\right)\right]$$

The conditional pdf of the received phase change in phase angle ($\Delta\Psi$) is given by:

$$f(\Delta\Psi \mid \Delta\phi) = \int_{-2\pi}^{2\pi} f(\Psi + \Delta\Psi \mid \phi + \Delta\phi) f(\Psi \mid \phi) d\Psi$$

The probability that the transmitted phase angle was $\Delta\phi$, given that the received phase change was $\Delta\Psi$ is given by (Bayes' theorem)

$$P(\Delta\phi \mid \Delta\Psi) = \frac{f(\Delta\Psi \mid \Delta\phi)P(\Delta\phi)}{f(\Delta\Psi)}$$

where $P(\Delta\phi)$ is the probability that symbol $\Delta\phi$ was transmitted (usually $1/M$) and $f(\Delta\Psi)$ is the unconditional probability of received phase changes given by $$f(\Delta\Psi) = \frac{1}{M}\sum_{k=0}^{M-1} f(\Delta\Psi \mid \Delta\phi_k)$$

The likelihood ratios for each of the M possible values of $\Delta\phi$ are of interest so we can write $$\Lambda_m(\Psi) = \frac{P(\Delta\phi_m \mid \Delta\Psi)}{P(\Delta\phi_{k:k\neq m} \mid \Delta\Psi)} = \frac{f(\Delta\Psi \mid \Delta\phi_M)}{\sum_{\text{all } k\neq m} f(\Delta\Psi \mid \Delta\phi_k)}; k \in \{0, 1 \ldots M-1\}$$

Likelihood ratios can also be written for each of the $\log_2 M$ bits used to define the transmitted phase change. The likelihood ratio for the lth bit can be written as:

$$\Lambda_l(\Psi) = \frac{\sum_{\Delta\phi:\text{bit } l=1} f(\Delta\Psi \mid \Delta\phi)}{\sum_{\Delta\phi:\text{bit } l=0} f(\Delta\Psi \mid \Delta\phi)}$$

Figure 2:
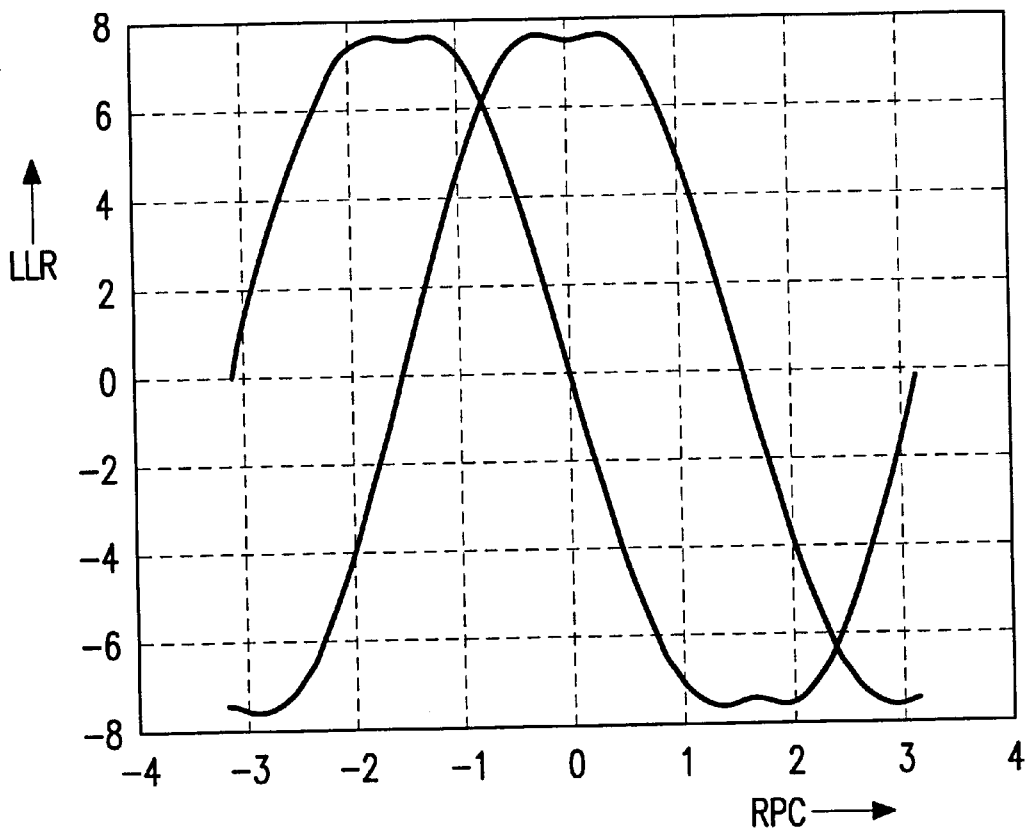
FIG. 2 shows graphically the log likelihood ratios (LLR) for least significant bit (lsb) and most significant bit (msb) with $\Delta\phi_k \in \{-3\pi/4, -\pi/4, \pi/4, 3\pi/4\}$ plotted against the received phase change (RPC) in radians.

By way of an example, consider a DQPSK system in which the 4 possible transmitted phase changes are $\{-3\pi/4, -\pi/4, \pi/4, 3\pi/4\}$. The pdf of $\Delta\Psi$ has been calculated for a Gaussian channel at a signal to noise ratio of 8 dB and in FIG. 2 the resulting log likelihood functions have been plotted for the lsb and msb.

The values of $\Delta\phi$ are related to the FSK frequencies by $\Delta\phi_k=2\pi f_k T_s/N$. Hence for a system having FSK frequencies of ±4.8 kHz and ±1.6 kHz and a symbol rate of 3200 Baud, $\pi/4=2\pi 1600/(3200N)$ is chosen, i.e. N=4 to obtain $\Delta\phi_k \in \{\pm 3\pi/4, \pm\pi/4\}$.

The best reliability is obtained when N is chosen to maximise the Euclidian distance between the set of points on the complex plane given by $\exp(j\Delta\phi_k)$, where $k\in\{0, 1 \ldots M-1\}$. This corresponds to setting $$N = \frac{hM}{M-1}$$

where h is the modulation index given by $$h=2\hat{f}T_s$$

where $\hat{f}$ is the maximum transmitted frequency deviation.

Figure 3:
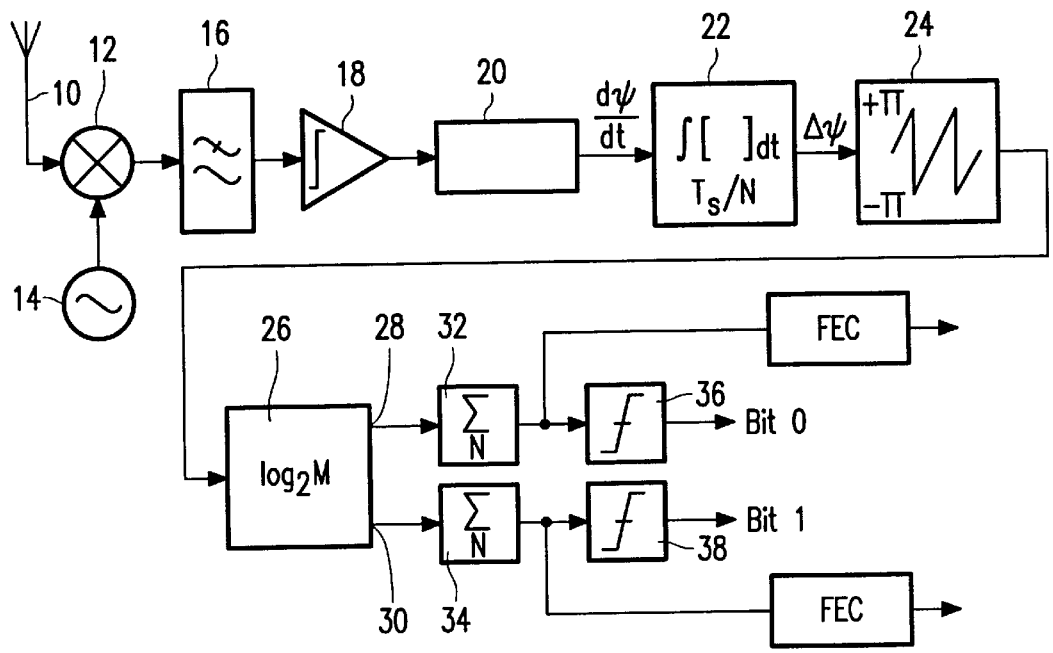
FIG. 3 is a block schematic diagram of an embodiment of the present invention.

FIG. 3 illustrates a receiver made in accordance with the present invention. A signal received by an antenna 10 is applied to a first input of a mixer 12. A local oscillator 14 is connected to a second input of the mixer 12. The frequency of the local oscillator 14 is chosen to mix the received signal down to a suitable IF. A filter 16 coupled to an output of the mixer 12 selects the wanted signals from the products of mixing. The output from the filter 16 is applied to a discriminator 20 either directly or by way of a limiting amplifier 18, which is optional. The discriminator 20 may be of any suitable type which estimates $d\Psi/dt$, the rate of the received phase change. The received phase change $\Delta\Psi$ measured over a fraction of the symbol time $T_s/N$ is determined using an integrate and dump circuit 22. In an alternative embodiment, the circuit 22 may comprise a block summer. A wrapping stage 24 is connected to an output of the stage 22 to wrap the values of $\Delta\Psi$ to keep them within the range $-\pi$ to $\pi$, which values are quantised to form an index which is applied to $\log_2 M$ SDI lookup tables 26. In the case of M =4, the lookup tables 26 has two outputs 28, 30 to provide the di-bits.

N consecutive samples of each of the outputs 28, 30 of the lookup tables 26 are summed in respective summing stages 32, 34. The respective sum signals are applied to respective threshold stages 36, 38 which provide a decision variable for each bit in accordance with the simple decision algorithm described above. The sign of each decision variable represents the most likely transmitted bit.

Figure 4:
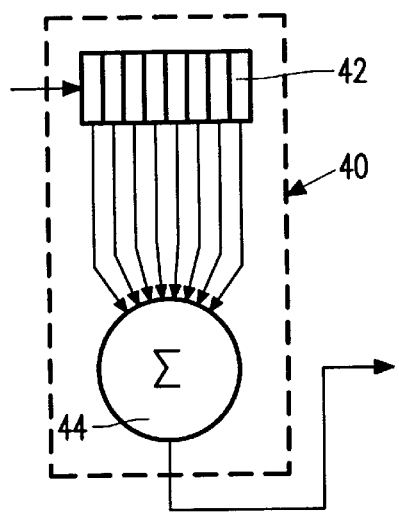
FIG. 4 is a block schematic diagram of a moving average circuit which can be used in place of the integrate and dump circuit 22 shown in FIG. 3.

FIG. 4 shows a moving average circuit 40 which can be used in place of the integrate and dump circuit 22 in FIG. 3. The moving average circuit comprises a FIR filter with all taps of a shift register 42 set to unity. The taps are coupled to a summing stage 44. The output is then fed into stages 24, 26, 32, 34, 36 and 38 as in FIG. 3.

From reading the present disclosure, other modifications will be apparent to persons skilled in the art. Such modifications may involve other features which are already known in the design, manufacture and use of M-ary FSK receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An M-ary FSK receiver comprising means for frequency demodulating a modulated signal, means for estimating the rate of change in the demodulated signal, means for deriving N estimates of phase change per symbol, where N has a value of at least 2, by integrating the estimated rate of change over respective fractions of a symbol period, means for converting these N estimates of phase change to soft decisions for the transmitted bits, and means for additively combining these soft decisions over at least a substantial period to obtain soft decisions for each of $\log_2 M$ bits per symbol.

2. A receiver as claimed in claim 1, characterised in that at least one threshold circuit is coupled to the additive combining means to provide a hard bit decision for each of the $\log_2 M$ outputs.

3. A receiver as claimed in claim 1, characterised in that each of the $\log_2 M$ additively combined outputs are used directly as soft decisions for further forward error correction processing.

4. A receiver as claimed in claim 1, characterised by means for wrapping output samples of the integrating means, said wrapped samples being supplied to said converting means.

5. A receiver as claimed in claim 1, characterised in that the integrating means comprises a digital moving averaging means.

6. A method of recovering an M-ary FSK signal, comprising frequency demodulating a modulated signal, estimating the rate of phase change in the modulated signal, deriving N estimates of phase change per symbol, where N has a value of at least 2, by integrating the estimated rate of phase change over respective fractions of a symbol period, converting these N estimates of phase change to soft decisions for the transmitted bits, and additively combining these soft decisions over at least a substantial period to obtain soft decisions for each of $\log_2 M$ bits per symbol.

7. A method as claimed in claim 6, characterised by applying the additively combined signals to threshold means to obtain hard bit decisions for each of the $\log_2 M$ outputs.

8. A method as claimed in claim 6, characterised by using each of the $\log_2 M$ additively combined outputs directly as soft decisions for further forward error correction processing.

9. A method as claimed in claim 6, characterised by wrapping said N estimates to keep them in a range having a width of $2\pi$ prior to converting them to soft decisions.

10. A method as claimed in claim 6, characterised by integrating the frequency demodulated signal to obtain a digital moving average.

* * * * *